United States Patent [19]

Neilsen

[11] Patent Number: 5,173,044

[45] Date of Patent: Dec. 22, 1992

[54] METHOD AND APPARATUS FOR THE MANUFACTURE OF CLINKER OF MINERAL RAW MATERIALS

[75] Inventor: Peter B. Neilsen, Valby, Denmark

[73] Assignee: F. L. Smidth & Co. A/S, Denmark

[21] Appl. No.: 523,854

[22] Filed: May 15, 1990

[51] Int. Cl.⁵ .......................................... F27B 15/00
[52] U.S. Cl. .................................... 432/14; 432/106; 106/654
[58] Field of Search .................... 432/106, 55, 14; 110/245, 246; 106/100

[56] References Cited

U.S. PATENT DOCUMENTS

| | | | |
|---|---|---|---|
| 3,843,314 | 10/1974 | Ishikawa | 432/58 |
| 3,881,862 | 5/1975 | Nishida et al. | 432/106 |
| 4,557,688 | 12/1985 | Nielsen | 432/14 |
| 4,715,811 | 12/1987 | Lawall | 432/106 |
| 4,759,711 | 7/1988 | Ichiyanagi et al. | 432/106 |
| 4,997,363 | 3/1991 | Hundebol | 432/14 |
| 5,085,581 | 2/1992 | Mendenhall | 432/106 |
| 5,098,285 | 3/1992 | Bauer | 432/106 |

Primary Examiner—Henry C. Yuen
Attorney, Agent, or Firm—Brumbaugh, Graves, Donohue & Raymond

[57] ABSTRACT

In a method and an apparatus for the manufacture of clinker of mineral raw materials, such as cement clinker, according to the wet process and ensuring an almost complete absorption of the $SO_2$-emission in the kiln gases from a kiln, such as a rotary kiln working according to this process, the wet process is converted into a semi-dry process in feeding the wet ground raw materials (6, 7) together with a raw mix component such as flyash (5) and/or precipitated filter dust (18, 20) into gas suspension drying unit (4) mounted—seen in the direction of movement of the kiln gases—after a kiln (1) and heated with kiln gases for creating a gas/material suspension in the drying unit (4) thereby preheating and drying the wet raw materials before their returning via an overflow bin (11) and a duct (14) to the kiln inlet (2) and their further treatment in the kiln (1) and thereby simultaneously through an $SO_2$ adsorption by the dry particles in the unit (4) ensuring the cleansing of the kiln gases.

6 Claims, 1 Drawing Sheet

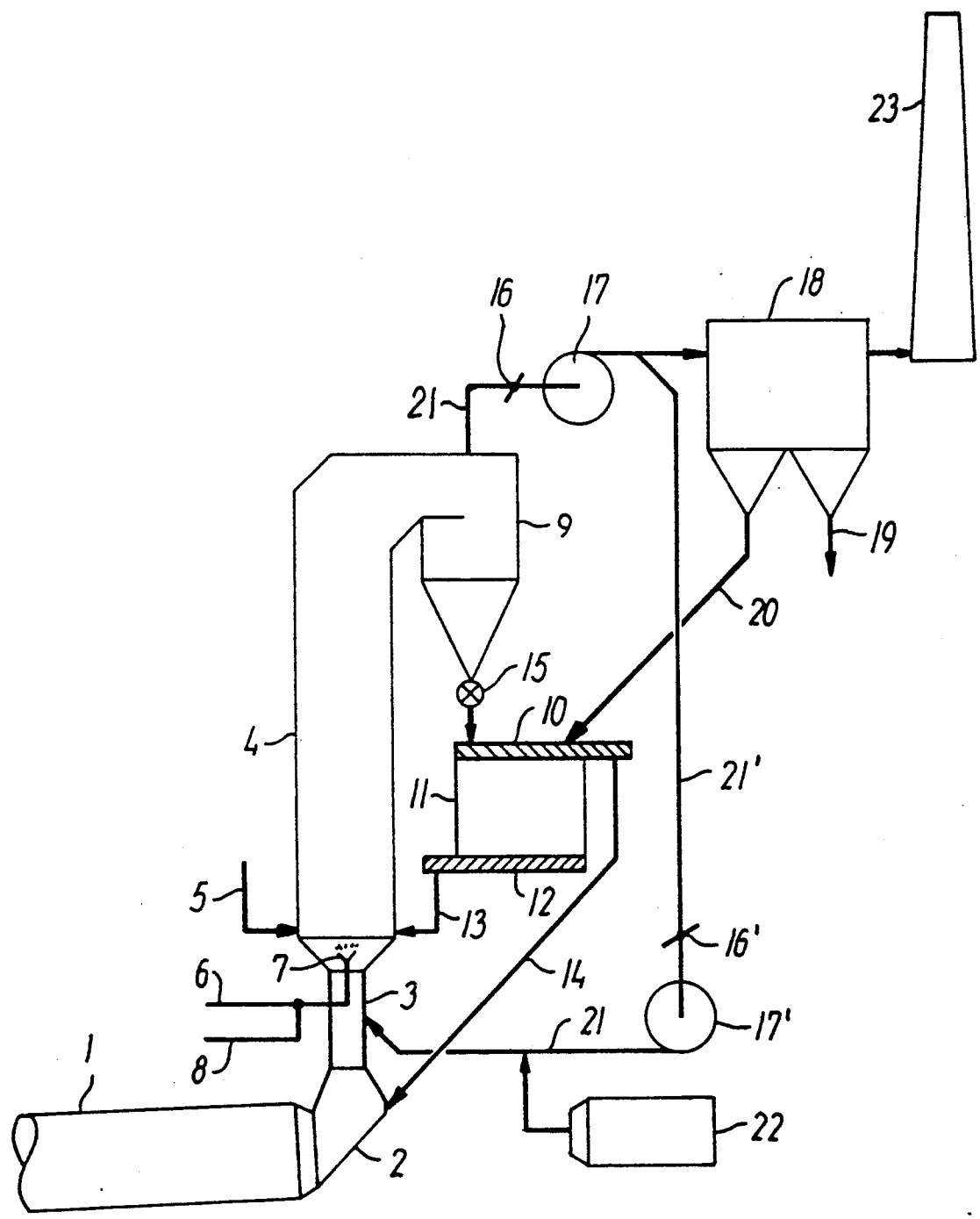

METHOD AND APPARATUS FOR THE MANUFACTURE OF CLINKER OF MINERAL RAW MATERIALS

BACKGROUND OF THE INVENTION

The invention relates to a method and an apparatus for the manufacture of clinker of mineral raw materials, such as cement clinker, according to the wet process during which a slurry of wet-ground mineral raw materials and water is preheated, dried, burned and sintered to clinker in a kiln plant, for instance a rotary kiln plant.

The wet process being a well known method for clinker manufacture since clinker production became industrialized has been described in numerous places, and Duda: "Cement Data Book", 3rd edition, sections 19.3 and 19.4 (Bauverlag GmbH, Wiesbaden und Berlin 1985) therefore serves as a general example of a citation in that respect. Although today the manufacture of clinker takes place preferably in dry process plants quite a number of wet process plants are still in use for instance both in the USA and in Great Britain due to the existence of easily available wet raw materials combined with the still fairly good running economy of wet plants in spite of other, clearly evident disadvantages of such plants.

One of these disadvantages is their very high specific sulfur dioxide ($SO_2$) emission compared to other more modern kiln types. Previously this $SO_2$-emission was not hardly considered at all, but already the present strict environmental air pollution regulations and especially the far more stricter regulations to be expected in the future might force wet process plants, such as cement production plants, in the countries in question either to close down or to be provided with expensive smoke gas desulfurization systems or to convert the wet process into a dry or semi-dry process thereby facilitating the desulfering of the smoke gases which may apart from the closing down situation causes a considerable increase of the production costs.

Various processes for removing oxides and other acidic gases from the gas from e.g. power plants and other kiln plants are known and referred to for instance in U.S. Pat. No. 4,555,390 which discloses a desulfuring method by means of a tubular reaction chamber acting as a so called gas suspension absorber coupled—seen in the direction of the movement of the kiln exit gases—after a kiln and fed with a dry recirculated powder such as fly ash, an absorption agent such as calcium oxides and water to the bottom of the reaction chamber for desulfuring through absorption the $SO_2$ in the kiln exit gases during the passage of the latter up through the chamber.

In this method the kiln exit gases from whatever type of kiln are treated in the gas suspension absorber irrespective of the process in the kiln proper and the desulfuring equipment as such therefore clearly represents an extra installation cost of the plant.

SUMMARY OF THE INVENTION

It is therefore the object of the invention to provide a method and an apparatus for reducing the $SO_2$-emission from a kiln plant working according to the wet process whereby the above mentioned disadvantages are remedied in integrating a part of the wet process as hitherto performed in the kiln proper into the desulfuring equipment and thereby make the combined process in the kiln and the desulfuring equipment far more effective to a reduced cost.

The object is obtained in combining the slurry drying, which in a wet process rotary kiln has hitherto taken place near the kiln material inlet, and the flue gas cleaning in one and same separate stationary unit, i.e. a reaction chamber coupled—seen in the direction of momement of the kiln exit gas—after the kiln and being a gas suspension drying unit of a tubular shape and with a vertical axis and functioning along the same principles as the above mentioned gas suspension absorber and in which the total amount of the added raw material slurry is fed and heated by kiln exit gas, the slurry thereby being preheated and dried during the addition of dry raw mix components, such as fly ash, fed separately to the bottom of the gas suspension drying unit in a rising gas/material suspension created in this unit during a simultaneous, almost complete absorption of the sulfur dioxide ($SO_2$) contained in the kiln gases, the $SO_2$ contaminated particles in same being hence separated from the exit gas in a separator coupled after the gas suspension drying unit and in a filter unit coupled after the separator, and the preheated, dried raw materials after their separation from the exit gases in the separator being fed to the kiln inlet for further heat treatment in the kiln.

Thus the preheating and drying of the raw materials which has hitherto taken place in the upper part of the kiln or by means of a spray-drier construction as known for instance from GB 1375566 are now performed in the gas suspension dried (GSD) together with the flue gas cleansing, and a corresponding cost-effective shortening of the kiln proper could be made.

The object is further obtained by means of an apparatus for carrying out the above described method the apparatus being a gas suspension drying unit having an elongated tubular form with a coneshaped bottom with a central gas inlet and coupled after the kiln and connected to the kiln inlet by a riser pipe the GSD being provided with means for injecting a slurry of wet ground mineral raw materials and water and desulfuring raw mix components, for instance fly ash, into the GSD at or near its bottom and in a separator being coupled after the GSD for separating preheated, dried raw materials from the exit gases and in means for feeding the preheated, dried raw materials and for returned precipitated filter dust to the kiln inlet or to the bottom of the GSD.

The apparatus may further comprise an overflow bin for regulating the feed of preheated, dried raw materials and/or precipitated filter dust to the kiln inlet or to the GSD, during starting-up phases or during breakdowns, if any, of the plant.

The apparatus may also include an auxiliary furnace or heat generator coupled to the kiln riser pipe for keeping the kiln gas temperature within given limits in the GSD especially during starting-up phases or breakdowns, if any, of the plant.

When desired the plant may be provided in a known manner with one or more preheater stages between the kiln raw material inlet and the GSD thereby eliminating the need for certain kiln internal fittings and thus enabling a further reduction of the kiln length. However, such a preheater arrangement may in other respects tend to raise the conversion costs of a wet process plant into a dry or semi-dry plant and thereby counteract the intended effect of the conversion.

Apart from a considerable reduction of the $SO_2$-emission according to the method and apparatus of the present invention the following other operational advantages contribute to make the relatively cheap conversion of a wet process kiln with the added proposed GSD-system economically attractive:

A reduced specific heat consumption is obtained due to a reduced exit gas temperature (about 150° C. after the GSD) and due to the possibility of adding dry raw mix components directly to the GSD, thereby reducing the total water input to the system.

An increase clinker homogeneity is obtained as raw mix components (i.e. fly ash) and/or precipitated filter dust is injected directly into the GSD and not as previously into the burning zone of the kiln.

Reduced maintenance costs of the internal fittings of the kiln as such fitting are to a considerable extent eliminated.

A production increase of 10-20% (calculated).

Hitherto calculations have shown that the above reduction in specific heat consumption amounts to some 90 kcal/kg clinker based upon the fact that an initial heat consumption of approx. 1330 kcal/kg clinker in an unmodified wet process kiln is reduced to approx. 1236 kcal/kg clinker in a wet process plant with the proposed GSD-system.

DESCRIPTION OF THE DRAWING

The drawing illustrates diagrammatically a non-limiting example of a wet process kiln converted into a semi-dry system by the addition of a gas suspension drying unit (GSD) according to the invention.

DETAILED DESCRIPTION OF THE INVENTION

Referring to the drawing 1 indicates a wet process rotary kiln the preheating and drying section of which has been "cut away" and replaced by a gas suspension drying unit or gas suspension drier (GSD) 4 connected to a kiln inlet 2 by a kiln riser pipe 3. The GSD has an elongated tubular shape and a coneshaped bottom in or near which is an inlet 6 for a slurry consisting of wet ground mineral raw materials (for the cement manufacture lime and clay) and water which by means of added, compressed air 8 through a nozzle 7 of a construction known per se is fed into the bottom of the GSD 4. A raw mix component, such as fly ash, is also fed into the GSD 4 at or near its bottom through a duct 5. The combined effects from the rising kiln exit gas stream, the injection of the wet raw materials through nozzle 7 and the addition of dry raw mix components through duct and inlet 5 and/or through duct and inlet 13, cf. below, creates in the GSD 4 a rising gas suspension stream. Due to the very high lim/$SO_2$-ratio in a GSD fed with the above mentioned different components almost a complete absorption of the $SO_2$ in the kiln gas takes place through the added dry particles without any separate addition of $Ca(OH)_2$ or CaO to the GSD. However, a certain amount of free CaO will enter the GSD contained in kiln gas, as well as precipitated dust from an exit gas filter 18 will be recirculated to the GSD through ducts 20 and 13 or 14.

Raw materials which have been dried and preheated in suspension in the GSD 4 will be separated from the exit gases in a separator 9 coupled after the GSD and returned via an outlet valve 15, a bin 11 and duct 14 to the kiln inlet 2 for further heat treatment in the kiln 1.

Partly desulfured exit gas with its contents of a fine fraction of $SO_2$-carrying particles is fed through a duct 21 with a regulating valve 16 and a fan 17 to the exit gas filter 18 from which precipitated dust is returned to the kiln and/or the GSD-system while the cleaned gas are led to the atmosphere via a stack 23. Part of the precipitated dust may alternatively be disposed of through an outlet 19 for reducing the alkali and/or $SO_3$-content in the clinker.

To ensure a sufficient and constant feed of dried preheated raw materials from the GSD 4 to the kiln inlet 2 during the running of the plant and a sufficient initial recirculation of treated raw materials and/or precipitated dust from filter 18 to the GSD 4 during starting-up phases or during breakdowns, if any, of the kiln 1 the system includes an overflow bin 11 with lower 1 and upper 10 transportation aggregates which together with the regulation valve 15 enables a controlled feed to the kiln inlet 2 through duct 14 and to the bottom of the GSD 4 through duct 13, respectively. Precipitated dust from filter 18 may through duct 20 be returned to bin 11 to be added to separated raw materials from separator 9.

Also to ensure sufficient heating of the GSD during starting-up phases or breakdowns, if any, of the kiln 1 and to keep the kiln gas temperature within given limits in the GSD the system includes a kiln exit gas return duct 21' with a regulating valve 16' and a fan 17' and an auxiliary furnace or heat generator 22 the produced heated gas of which via duct 21' is fed into the kiln riser pipe 3 and hence into the GSD.

I claim:

1. A method for manufacturing clinker or raw materials according to the wet-process wherein a slurry of wet-ground raw material is preheated, dried, burned and sintered to clinker in a rotary kiln plant, said method comprising the steps of
    a) feeding substantially the total amount of wet-ground raw material slurry to be treated to a gas suspension drier having a substantially verticle axis,
    b) passing substantially all of the hot kiln gases from the kiln to the bottom of the gas suspension drier,
    c) adding a dry desulfuring raw mix material such as fly ash at or near the bottom of the gas suspension drier,
    d) causing the hot kiln gases, raw material slurry and desulfuring dry raw mix material to form a gas suspension and to pass upwardly through the gas suspension drier, thereby preheating and drying the raw material in the slurry and causing the absorption of sulfur dioxide contained in the hot kiln gases,
    e) passing the resulting preheated dried material-gas suspension upwardly and out of the gas suspension drier and separating the preheated dried material from the suspension gas in a separator, and
    f) passing the preheated dried material to the rotary kiln and burning the material in the kiln to form clinker.

2. A method according to claim 1, including the step of recycling a portion of the preheated dried material to the bottom of the gas suspension drier to be mixed with the slurry and the hot kiln gases.

3. A method according to claim 1, including the step of passing the suspension gas from the separator through filter means so as to remove fine particles from the gas.

4. A method according to claim 3, including the step of passing the removed fine particles to the kiln and/or the gas suspension drier.

5. The method according to claim 1 wherein $SO_2$ contained in the hot kiln gases is substantially completely absorbed by the material in the gas suspension drier.

6. The method according to claim 1 wherein the clinker is cement clinker.

* * * * *